United States Patent [19]

Hamada et al.

[11] 4,016,118

[45] Apr. 5, 1977

[54] POLYOLEFIN PLASTIC COMPOSITIONS

[75] Inventors: Kenzo Hamada; Hiroshi Uchiyama, both of Hirakata, Japan

[73] Assignees: E. C. Chemical Industries & Co., Ltd.; C. Itoh & Co., Ltd., both of Osaka, Japan

[22] Filed: Aug. 12, 1975

[21] Appl. No.: 604,045

[30] Foreign Application Priority Data

Aug. 16, 1974 Japan .............................. 49-94424

[52] U.S. Cl. ...................................... 260/17.4 SG
[51] Int. Cl.[2] .......................................... C08L 5/00
[58] Field of Search ................ 260/30.4 R, 17.4 SG

[56] References Cited

UNITED STATES PATENTS 3,639,312  2/1972  Turner .................. 260/17.4 SG

Primary Examiner—Harry Wong, Jr.
Attorney, Agent, or Firm—Wenderoth, Lind & Ponack

[57] ABSTRACT

A polyolefin plastic composition having improved transparency and reduced molding shrinkage, which consists essentially of at least one polymer or copolymer of an aliphatic monoolefin and dibenzylidene sorbitol, the proportion of the dibenzylidene sorbitol being 0.1 to 0.7% by weight based on the total weight of the composition.

4 Claims, 1 Drawing Figure

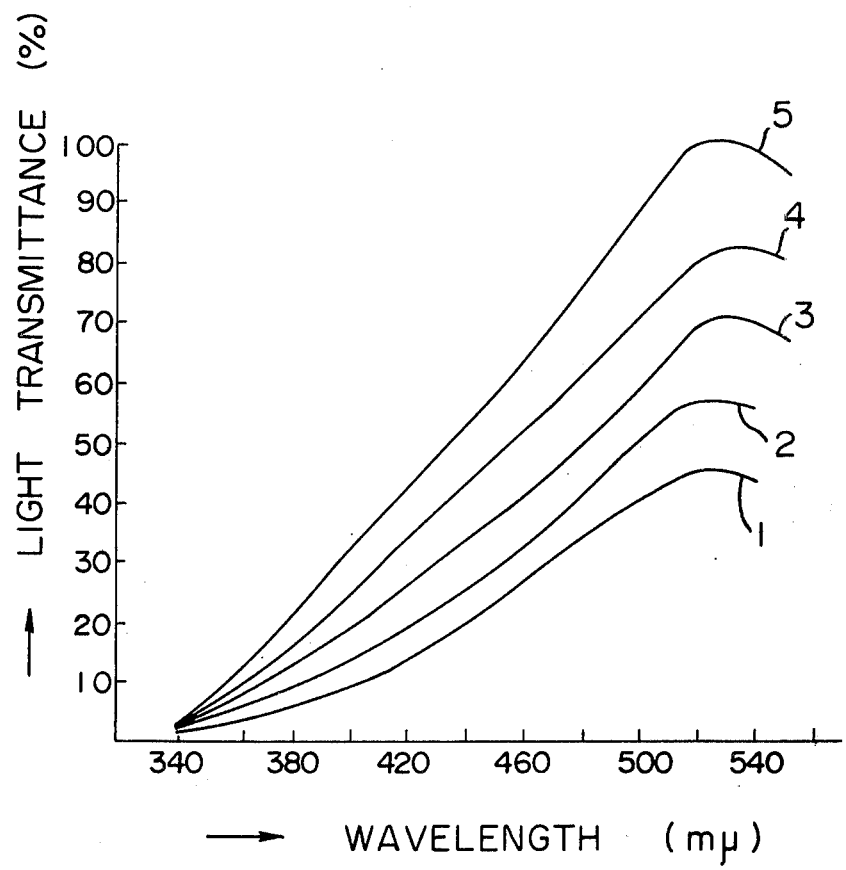

POLYOLEFIN PLASTIC COMPOSITIONS

This invention relates to a polyolefin plastic composition having improved transparency and reduced molding shrinkage.

Polyolefins, for example, polyethylene or polypropylene, have found a wide range of applications as packaging materials and containers in the form of films, sheets or hollow articles, but because of their poor transparency, their use has been limited. In particular, they are unsuitable as packaging materials or containers for such articles as are desired to be visible through them (e.g., cosmetics or foodstuffs).

Attempts have been made to improve the transparency of polyolefins by incorporating certain kinds of additives in them, and para-t-butylbenzoic acid, its salts, low-molecular-weight waxy polyethylene, and low-molecular-weight waxy polypropylene have been suggested as the additives. These conventional additives, however, are unable to bring about a sufficient improvement of the transparency because they deteriorate the mechanical and chemical properties of the products, or have poor miscibility with the polyolefins.

It is an object of this invention, therefore, to provide an additive which can improve the transparency of polyolefins without deteriorating the mechanical and chemical properties of the final products.

Another object of this invention is to provide a polyolefin plastic composition having improved transparency as a result of incorporating a specific additive.

Still another object of this invention is to provide a polyolefin plastic composition having reduced molding shrinkage.

The above objects of this invention can be achieved by a plastic composition having improved transparency and reduced molding shrinkage which consists essentially of at least one aliphatic monoolefin polymer or copolymer and dibenzylidene sorbitol, the amount of the dibenzylidene sorbitol being 0.1 to 0.7% by weight based on the total weight of the composition.

Examples of olefin polymers whose transparency can be improved and whose molding shrinkage can be reduced conveniently by this invention are polymers and copolymers of aliphatic monoolefins containing 2 to 6 carbon atoms which have an average molecular weight of about 10,000 to 200,000, preferably about 30,000 to 150,000, such as polyethylene, polypropylene, a crystalline ethylene-propylene copolymer, and polymethyl pentene. Polyolefins as exemplified above are basically linear regular polymers which may optionally contain short side chains.

The novel aspect of this invention is that the olefin polymer or copolymer contains an active amount of dibenzylinene sorbitol.

The dibenzylidene sorbitol is a white powder having a melting point of 210° to 212° C. which is obtained by reacting 1 mole of d-sorbitol and 2 moles of benzaldehyde in the presence of an acid catalyst at an elevated temperature. It includes an isomer of the formula

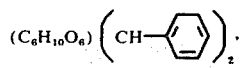

and is typically expressed by the following structural formula

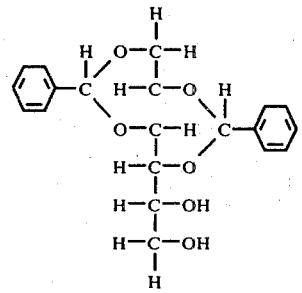

The dibenzylidene sorbitol obtained by the above method contains about 2% of by-product monobenzylidene sorbitol and tribenzylidene sorbitol. Although it is not always necessary to remove these impurities, the product is preferably purified so that the purity of the dibenzylidene sorbitol becomes 99.0 to 99.5% or more. The purification can be performed by recrystallization from dimethyl formamide.

The proportion of the dibenzylidene sorbitol in the composition of this invention is 0.1 to 0.7% by weight, preferably 0.3 to 0.5% by weight, based on the total weight of the composition. When the content of dibenzylidene sorbitol is less than 0.1% by weight, the resulting composition is not sufficiently improved in respect of transparency and molding shrinkage. Even when the content of dibenzylidene sorbitol is increased beyond 0.7% by weight, no additional advantage can be obtained, although it could be incorporated in an amount of more than 0.7% by weight. Alternatively, a thick composition containing as much as up to about 4% by weight of dibenzylidene sorbitol may be used as a master batch.

The composition of this invention can be obtained by adding a specific amount of dibenzylidene sorbitol to the olefin polymer or copolymer, and merely mixing them by any suitable mixing means.

Other additives such as a transparent coloring agent or plasticizer (e.g., dioctyl phthalate, dibutyl phthalate, dioctyl stearate, or dioctyl adipate), can be added to the composition of this invention so long as they do not adversely affect the improvement of transparency and/or the reduction of molding shrinkage. It has been found that plasticizers such as those exemplified above aid in the improvement of the transparency by dibenzylidene sorbitol.

The olefin polymer or copolymer used in the composition of this invention is crystalline, and the diffraction of light caused by microcrystals contained in it is considered to be responsible for the deterioration of the transparency of the polymer. Although the present invention is not intended to be limited by any theory, we assume that dibenzylidene sorbitol takes a certain kind of three dimensional structure in the polyolefin composition thereby to render the microcrystals even finer and consequently, improve the transparency of the polymer.

The composition of this invention is suitable for use as packing materials and container materials for cosmetics and foodstuffs because it gives films, sheets or hollow articles having improved transparency, reduced molding shrinkage, and superior mechanical and chemical properties.

The accompanying drawing is a graphic representation showing the improvement of the light transmittance of polypropylene when dibenzylidene sorbitol is added to it in varying amounts.

The following Examples further illustrate the present invention. All the parts and percents given in these Examples are by weight unless otherwise specified.

The transparency (haze value) and molding shrinkage were measured by the following methods.

1. Haze value — ASTM D 1003—61

The test piece used was an injection-molded plate with a thickness of 0.2 mm.

2. Molding shrinkage (shrinkage)

A test piece formed by injection-molding the composition of this invention at a predetermined injection temperature using a mold having a cavity in the shape of a rectangular pararellepiped, 55 mm long with the section measuring 10 × 10 mm. The shrinkage value was calculated from the following equation.

$$\text{Shrinkage} = \frac{\left(\begin{array}{c}\text{Depth of the}\\ \text{mold cavity}\end{array}\right) - \left(\begin{array}{c}\text{Thickness of}\\ \text{the test piece}\end{array}\right)}{\text{Depth of the mold cavity}} \times 100 \,(\%)$$

The injection molding to form the test pieces in the tests on the haze value and molding shrinkage was carried out under the following conditions.

Injection temperature: Predetermined temperatures shown in Examples
Injection time: 5 seconds
Hold-up time: 3 seconds
Cooling time: 40 seconds
Mold temperature: 80° C.

EXAMPLE 1

A resin composition obtained by adding a predetermined amount of dibenzylidene sorbitol (DBDS) having a purity of 99.5% to pellets of an ethylene-propylene copolymer having a number average molecular weight of 40,000 and containing 90 mole% of propylene units (Mitsubishi NOBLENE BC-8, trademark for a product of Mitsubishi Petrochemical Co., Ltd.) and mixing them by a blender was injection-molded at an injection temperature of 240° C. to form test pieces. The constituent proportions of the resin composition and the haze values and shrinkage values of the test pieces are shown in Table 1.

Table 1

| Composition No. | Constituent proportions (parts) | | Properties of the injection-molded products | |
|---|---|---|---|---|
| | DBDS | Copolymer | Haze value (%) | Shrinkage (%) |
| 1 – 1 | — | 100 | 80 | 13.9 |
| 1 – 2 | 0.2 | 99.8 | 54 | 10.5 |
| 1 – 3 | 0.3 | 99.7 | 49 | 5.2 |
| 1 – 4 | 0.5 | 99.5 | 38 | 1.3 |
| 1 – 5 | 0.7 | 99.3 | 36 | 1.53 |

EXAMPLE 2

Test pieces were prepared in the same way as in Example 1 except that pellets of polypropylene having an average molecular weight of 80,000 (NOBLENE FL-6, trademark for a product of Mitsubishi Petrochemical Co., Ltd.) were used instead of the ethylene-propylene copolymer, and the injection temperature was changed to 250° C. The constituent proportions of the resin composition and the haze values and shrinkage values of the test pieces are shown in Table 2.

Table 2

| Composition No. | Constituent proportions (parts) | | Properties of the injection-molded products | |
|---|---|---|---|---|
| | DBDS | Polypropylene | Haze value (%) | Shrinkage (%) |
| 2 – 1 | — | 100 | 87 | 12.5 |
| 2 – 2 | 0.2 | 99.8 | 60 | 9.4 |
| 2 – 3 | 0.5 | 99.5 | 23 | 6.0 |

EXAMPLE 3

Test pieces were prepared in the same way as in Example 1 except that pellets of polyethylene having a number average molecular weight of 60,000 (NOVATEC ET 010, trademark for a product of Mitsubishi Chemical Industries, Ltd.) were used instead of the ethylene-propylene copolymer, and the injection temperature was changed to 230° C. The constituent proportions of the resin composition, and the haze values and shrinkage values of the test pieces are shown in Table 3.

Table 3

| Composition No. | Constituent proportions (parts) | | Properties of the injection-molded products | |
|---|---|---|---|---|
| | DBDS | Polyethylene | Haze value (%) | Shrinkage (%) |
| 3 – 1 | — | 100 | 75 | 15.1 |
| 3 – 2 | 0.2 | 99.8 | 50 | 5 |
| 3 – 3 | 0.5 | 99.5 | 26 | 2.4 |

EXAMPLE 4

Test pieces were prepared in the same way as in Example 1 except that a methyl pentene polymer (a mixture of 3 parts of DX-845 and 1 part of DX-836 having a melt index of 8, a product of Mitsui Petrochemical Co., Ltd.) was used instead of the copolymer, and the injection temperature was changed to 270° C. The constituent proportions of the resin composition and the haze values and shrinkage values of the test pieces are shown in Table 4.

Table 4

| Composition No. | Constituent proportions (parts) | | Properties of the injection-molded products | |
|---|---|---|---|---|
| | DBDS | Polymethyl pentene | Haze value (%) | Shrinkage (%) |
| 4 – 1 | — | 100 | 22 | 14.9 |
| 4 – 2 | 0.2 | 99.8 | 19 | 10.2 |
| 4 – 3 | 0.5 | 99.5 | 17 | 7.0 |

EXAMPLE 5

Test pieces were prepared in the same way as in Example 1 except that DBDS having a purity of 90.0% and the same polypropylene as in Example 2 were used. The constituent proportions and the haze values and shrinkage values of the test pieces are shown in Table 5.

Table 5

| Composition No. | Constituent proportions (parts) | | Properties of the injection-molded products | |
|---|---|---|---|---|
| | DBDS | Polypropylene | Haze value (%) | Shrinkage (%) |
| 5 – 1 | 0.2 | 99.8 | 73 | 11.5 |
| 5 – 2 | 0.5 | 99.5 | 71 | 7.2 |
| 5 – 3 | 0.7 | 99.3 | 73 | 7.2 |

EXAMPLE 6

A composition consisting of 99.5 parts of pellets of polypropylene having an average molecular weight of 35,000 (Yarn Grade FY 4012, trademark for a product of Sumitomo Chemical Co., Ltd.) and 0.5 part of DBDS having a purity a 99.5% was extruded from a T-die at a cylinder temperature of 235° C. to form a sheet 100 cm wide and 0.15 mm thick.

For comparison, sheets were prepared in the same way as above except that DBDS was not added at all, or 0.5 part of p-t-butylbenzoic acid was added instead of DBDS.

The properties of the sheets are shown in Table 6.

Table 6

| Composition No. | Constituent proportions (parts) | | | Haze value (%) | Properties of the sheets | | | | | |
|---|---|---|---|---|---|---|---|---|---|---|
| | | | | | Tensile strength (Kg/mm²) | | 100 % Modulus (Kg/mm²) | | Tear strength (Kg/mm²) | |
| | DBDS | p-t-butyl benzoic acid | Polypropylene | | L | T | L | T | L | T |
| 6 – 1 | 0.5 | — | 99.5 | 16 | 4.8 | 4.2 | 3.5 | 3.4 | 18.5 | 14.2 |
| 6 – 2 | — | — | 100 | 36 | 4.2 | 3.5 | 2.3 | 2.1 | 14.9 | 11.6 |
| 6 – 3 | — | 0.5 | 99.5 | 22 | 4.2 | 3.6 | 2.4 | 2.1 | 13.7 | 11.2 |

Note:
L = longitudinal direction
T = transverse direction

EXAMPLE 7

A resin composition prepared by mixing 99.7 parts of pellets of the same ethylene-propylene copolymer as used in Example 1, 0.3 part of DBDS having a purity of 99.5% and 1 part of dioctyl phthalate as a plasticizer by a blender was injection-molded at an injection temperature of 240° C. to form a test piece. The test piece had a haze value of 10%.

EXAMPLE 8

Test pieces, each 0.5 mm thick, 10 mm wide and 20 mm long, were prepared in the same way as in Example 7 from a composition prepared by adding the same DBDS as used in Example 7 in varying amounts from 0.1 to 0.5 part per 100 parts of the composition to the same polypropylene as used in Example 2. For comparison, a test piece was prepared in the same way as above except that DBDS was not added.

The light transmittance of each of the test pieces was measured in the following manner.

The test piece was placed in a circular cell a light transmittance tester (Spectromic-20, a product of Shimazu Seisakusho), the light transmittance of the test piece at various wavelengths was measured. The results obtained were plotted in the accompanying drawing.

Curves 1, 2, 3, 4, and 5 in the drawing are wavelength $(m\mu)$-transmittance (%) curves corresponding to 0., 0.1, 0.3, 0.4, and 0.5 part, respectively, of DBDS added.

What we claim is:

1. A polyolefin plastic composition having improved transparency and reduced molding shrinkage, which consists essentially of at least one homopolymer or copolymer of an aliphatic monoolefin containing 2 to 6 carbon atoms which has an average molecular weight of about 10,000 to 200,000, said copolymer made by polymerizing said monoolefins with one another and dibenzylidene sorbitol, the proportion of the dibenzylidene sorbitol being 0.1 to 0.7% by weight based on the total weight of the composition.

2. The composition of claim 1 wherein the aliphatic monoolefin is selected from the group consisting of ethylene, propylene and methyl pentene.

3. The composition of claim 1 wherein the dibenzilidene sorbitol has a purity of 99 to 99.5%.

4. The composition of claim 1 which further includes at least one plasticizer selected from the group consisting of dioctyl phthalate, dibutyl phthalate, dibutyl stearate and dioctyl adipate.

* * * * *

UNITED STATES PATENT AND TRADEMARK OFFICE
CERTIFICATE OF CORRECTION

PATENT NO. : 4,016,118
DATED : April 5, 1977
INVENTOR(S) : Kenzo HAMADA and Hiroshi UCHIYAMA It is certified that error appears in the above—identified patent and that said Letters Patent is hereby corrected as shown below:

Column 2, line 43, change "dioctyl stearate" to -- octyl stearate --.

Column 6, line 48 (Claim 4, line 3) change "dibutyl stea-" to -- butyl stea- --.

Signed and Sealed this

Twenty-second Day of March 1983

[SEAL]

Attest:

Attesting Officer

GERALD J. MOSSINGHOFF
Commissioner of Patents and Trademarks

REEXAMINATION CERTIFICATE (887th)
United States Patent [19]
Hamada et al.

[11] B1 4,016,118
[45] Certificate Issued    Jul. 5, 1988

[54] POLYOLEFIN PLASTIC COMPOSITIONS

[75] Inventors: Kenzo Hamada; Hiroshi Uchiyama, both of Hirakata, Japan

[73] Assignees: Milleken Research Corp., Spartenburg, S.C.; C. Itoh & Co., Osaka, Japan; a part interest

Reexamination Request:
No. 90/001,197, Mar. 23, 1987

Reexamination Certificate for:
Patent No.: 4,016,118
Issued: Apr. 5, 1977
Appl. No.: 604,045
Filed: Aug. 12, 1975

[30] Foreign Application Priority Data

Aug. 16, 1974 [JP]  Japan .................. 49-94424

[51] Int. Cl.$^4$ ................................. C08L 5/00
[52] U.S. Cl. ................................. 524/108; 523/100
[58] Field of Search ................. 524/108; 523/100

[56]       References Cited
           PUBLICATIONS

Japanese Publication No. 45-22008, Jul. 25, 1970, 2 pages.

Primary Examiner—Paul R. Michl

[57]         ABSTRACT

A polyolefin plastic composition having improved transparency and reduced molding shrinkage, which consists essentially of at least one polymer or copolymer of an aliphatic monoolefin and dibenzylidene sorbitol, the proportion of the dibenzylidene sorbitol being 0.1 to 0.7% by weight based on the total weight of the composition.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

Claims 3 and 4 are determined to be patentable as amended.

New claims 5-9 are added and determined to be patentable.

3. The composition of claim [1] *9* wherein the dibenzilidene sorbitol has a purity of 99 to 99.5%.

4. The composition of claim [1] *9* which further includes at least one plasticizer selected from the group consisting of dioctyl phthalate, dibutyl phthalate, dibutyl stearate and dioctyl adipate.

*5. A polyolefin plastic composition having improved transparency and reduced molding shrinkage, which consists essentially of at least one homopolymer or copolymer of an aliphatic monolefin containing three to six carbon atoms which has an average molecular weight of about 10,000 to 200,000, said copolymer made by polymerizing said monolefins with one another and, as a separate component, dibenzylidene sorbitol, the proportion of the dibenzylidene sorbitol being 0.1 to 0.7% by weight based on the total weight of the composition.*

*6. A polyolefin plastic composition having improved transparency and reduced molding shrinkage, which consists essentially of at least one homopolymer or copolymer of an aliphatic monolefin selected from propylene and methylpentene which has an average molecular weight of about 10,000 to 200,000 said copolymer made by polymerizing said monolefins with one another and, as a separate component, dibenzylidene sorbitol, the proportion of the dibenzylidene sorbitol being 0.1 to 0.7% by weight based on the total weight of the composition.*

*7. A polyolefin composition having improved transparency and reduced molding shrinkage, which consists essentially of polypropylene which has an average molecular weight of about 10,000 to 200,000 and dibenzylidene sorbitol, the proportion of the dibenzylidene sorbitol being 0.1 to 0.7% by weight based on the total weight of the composition.*

*8. A polyolefin plastic composition having improved transparency and reduced molding shrinkage, which consists essentially of a polymer selected from polypropylene, ethylene-propylene copolymer and polymethylpentene which has an average molecular weight of about 10,000 to 200,000 and dibenzylidene sorbitol, the proportion of the dibenzylidene sorbitol being 0.1 to 0.7% by weight based on the total weight of the composition.*

*9. A polyolefin plastic composition having improved transparency and reduced molding shrinkage, which consists essentially of at least one copolymer of ethylene and an aliphatic monolefin containing three to six carbon atoms which has an average molecular weight of from about 10,000 to 200,000, said copolymer made by polymerizing said ethylene and said aliphatic monolefin with one another and, as a separate component, dibenzylidene sorbitol, the proportion of the dibenzylidene sorbitol being 0.1 to 0.7% by weight based on the total weight of the composition.*

* * * * *